United States Patent
Lynn et al.

(10) Patent No.: US 9,056,688 B1
(45) Date of Patent: Jun. 16, 2015

(54) APPARATUS AND METHOD FOR DEFLECTING AIRFLOW IN A STRUCTURE WITH A VENTED REAR WALL

(71) Applicant: Blast Deflectors, Inc., Reno, NV (US)

(72) Inventors: Christopher G Lynn, Reno, NV (US); Mark S Boe, Reno, NV (US); Richard D Kirkman, Pocatello, ID (US); Gregory A Rocha, Reno, NV (US)

(73) Assignee: Blast Deflectors, Inc., Reno, NV (US)

( * ) Notice: Subject to any disclaimer, the term of this patent is extended or adjusted under 35 U.S.C. 154(b) by 0 days.

(21) Appl. No.: 14/518,192

(22) Filed: Oct. 20, 2014

(51) Int. Cl.
 *B64F 1/26* (2006.01)
(52) U.S. Cl.
 CPC ........................................ *B64F 1/26* (2013.01)
(58) Field of Classification Search
 CPC ............................................................ B64F 1/26
 USPC ........................................................... 181/210
 See application file for complete search history.

(56) References Cited

U.S. PATENT DOCUMENTS

| | | | |
|---|---|---|---|
| 2,608,363 A * | 8/1952 | Shumaker | 244/114 B |
| 2,726,830 A | 6/1953 | Brown | |
| 2,826,382 A | 3/1958 | Hayden | |
| 3,037,729 A | 6/1962 | Phillips | |
| 3,797,787 A | 3/1974 | Watanabe | |
| 5,127,609 A | 7/1992 | Lynn | |
| 5,429,324 A * | 7/1995 | Lynn | 244/114 B |
| 5,739,482 A * | 4/1998 | Shima et al. | 181/210 |
| 6,016,888 A * | 1/2000 | Lynn | 181/218 |
| 6,112,849 A * | 9/2000 | Garbers et al. | 181/210 |
| 6,575,113 B1 | 6/2003 | Fischer et al. | |
| 6,802,477 B2 | 10/2004 | Campion | |
| 7,793,886 B2 * | 9/2010 | Henson, III | 244/114 B |
| 8,360,361 B2 | 1/2013 | Wadley et al. | |
| 2002/0144473 A1 * | 10/2002 | Satomi et al. | 52/173.1 |
| 2003/0111292 A1 | 6/2003 | Hess | |
| 2007/0151797 A1 * | 7/2007 | Roark et al. | 181/210 |
| 2010/0243369 A1 * | 9/2010 | Fusiek et al. | 181/210 |

\* cited by examiner

*Primary Examiner* — Forrest M Phillips
(74) *Attorney, Agent, or Firm* — Watson Rounds; Marc. D. Foodman

(57) ABSTRACT

An apparatus and method for reducing noise from aircraft high power ground run-ups. The ground run-up enclosure includes a vented tall rear noise attenuating wall and a separate jet blast deflector to direct the jet blast up and out of a facility. The vented rear wall is positioned behind the jet blast deflector and extends above a discharge lip of the deflecting surface of the jet blast deflector surface. An exit port of the rear vent channel allows airflow moving through the rear vent to exit and combine with the airflow deflected along the jet blast deflecting surface discharge lip. The vent opening in the rear wall is located in the back of the rear noise attenuating wall.

20 Claims, 6 Drawing Sheets

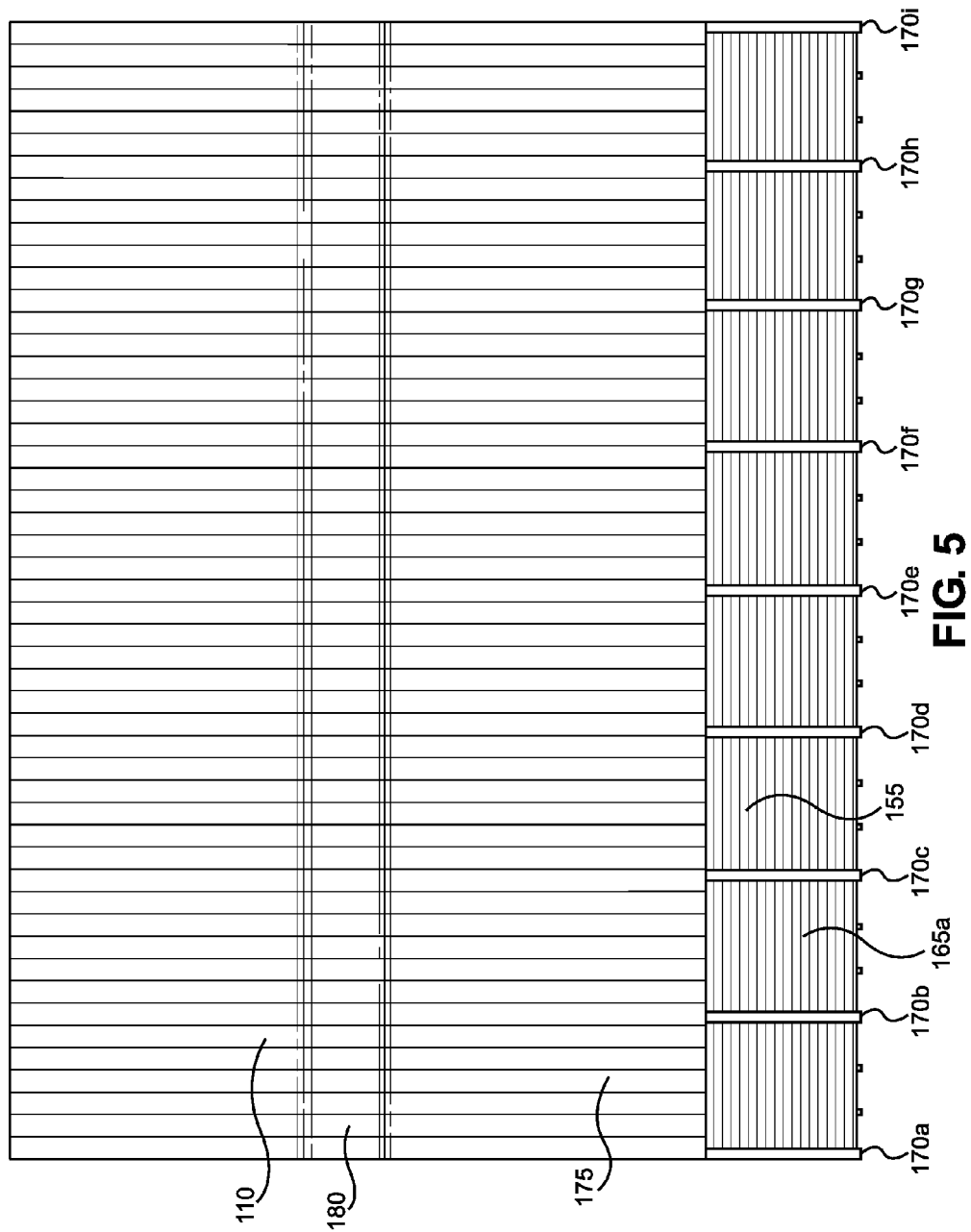

APPARATUS AND METHOD FOR DEFLECTING AIRFLOW IN A STRUCTURE WITH A VENTED REAR WALL

COPYRIGHT NOTICE

Portions of this disclosure contain material in which copyright is claimed by the applicant. The applicant has no objection to the copying of this material in the course of making copies of the application file or any patents that may issue on the application, but all other rights whatsoever in the copyrighted material are reserved.

BACKGROUND

The present invention relates generally to ground run-up enclosures (GRE) used to reduce the noise created by high power maintenance operations by jet and turboprop aircraft. These facilities are also know as engine ground run pens (GRP), Run-up facilities (RUF) and hush houses. This invention relates particularly to ground run up facilities utilizing a separate jet blast deflector located ahead of the rear wall and having a vented rear wall. Jet blast deflectors are also known as jet blast fences or jet blast screens. The present invention is for a ground run-up enclosure utilizing a separate jet blast deflector located ahead of a vented rear noise wall. This design allows the separate jet blast deflector to be located close to the noise attenuating rear wall by providing a vent in the rear noise attenuating wall to provide a mixing air source for the high velocity air discharged at the discharge lip of the jet blast deflector. This allows the overall length of a traditional ground run-up enclosure utilizing a separate jet blast deflector to be reduced and improves airflow within the facility. This system may be used to provide noise attenuation for various types of jet and turbo prop aircraft testing. The structure has a jet blast deflector located ahead of a rear noise attenuating wall that is vented to allow mixing airflow to be drawn to the discharge lip of the jet blast deflector.

High power engine run-ups on the ground at many airports have led to issues with the noise created by the aircraft engines operating at high power levels often for sustained periods. Nearby residential and commercial areas are sensitive to the high noise levels created.

Over the past twenty five years or so, ground run-up enclosures have developed into large, complex structures which surround the test aircraft with tall noise attenuating walls. They are typically built with separate jet blast deflectors located ahead of the rear noise wall to deflect the jet blast out of the structure. The jet blast deflectors are typically located well ahead of the rear wall to provide a source for mixing air to enter the rear of the facility. In view of the size of modern aircraft and the powerful engines used to power them, the jet blast deflectors inside a ground run-up enclosure must be tall enough and strong enough to withstand jet blasts at heights of up to approximately 25 feet or more. Different types of blast structures that are known to deflect aircraft exhaust flow and/or reduce noise associated with such exhaust flows are shown, for example, in: (1) U.S. Pat. No. 5,127,609 to Lynn, issued Jul. 7, 1992; (2) U.S. Pat. No. 5,429,324 to Lynn, issued Jul. 4, 1995; and (3) U.S. Pat. No. 5,865,640 to Lynn, issued Jan. 5, 1999.

High power ground testing of modern era aircraft with residential and other noise sensitive areas nearby gave rise to the need to provide noise attenuation. Airport operational aprons are extremely crowded due to the increase in the numbers of air travelers both for personal and business purposes, and due to the increased use of air freight to transport all types of goods. The use of airport resources by all types of aircraft is currently at an all time high and expected to continue to rise. In addition, as airports have grown and become busier, so has the demand for noise sensitive uses of the areas immediately surrounding the airports. With the demand for airport resources and real estate in high-growth mode, using the space on airports as efficiently as possible has become a significant challenge. For these reasons, it is desirable to have ground run-up enclosures that are more compact in size while still being able to operate in a variety of wind conditions and to do so while reducing noise associated with the high power aircraft engine operation in a highly efficient manner.

Ground Run-Up Enclosures comprising three or four sides with or without a roof are most commonly used to mitigate the noise created by high power engine ground run-ups and other aircraft maintenance procedures. Some GRE's can use a single surface straight, angled or curved rear noise attenuating wall without a separate jet blast deflector to deflect the jet blast. This single surface combined jet blast deflection surface and noise attenuating rear wall can be extremely aerodynamically inefficient, especially when the aircraft is surrounded by tall noise attenuating walls. The effect being a loss of momentum in the high velocity engine exhaust airflow resulting in a buildup of pressure at the rear wall. Recirculation of airflow within the facility results in decreasing the rearward momentum of the airflow within the ground run-up enclosure and also reduces the discharge velocity and angle of the deflected engine exhaust airflow out of the facility. In this aerodynamically inefficient configuration utilizing a combined jet blast deflector and rear noise wall, the mixing region between the high velocity flow up the deflecting surface and the ambient air must occur above the noise wall and noise created in this mixing region cannot be contained by the noise attenuating wall.

Other issues arise with respect to ground run-up enclosure designs which do not use a separate jet blast deflector, such as for example, noise being reflected by solid surfaces of the noise attenuating wall used to deflect the high velocity engine airflow. This reflected noise is directed out the front of the facility off of the solid rear wall surface. It is possible to acoustically treat these rear noise attenuating wall surfaces used to redirect jet blast, but such acoustic treatments are costly, inefficient and require a great deal of maintenance. Also in this design the mixing region of the airflow occurs above the top of the wall which means that any sound treatment applied to the wall would not reduce noise generated by the mixing airflows above the wall.

Many ground run-up enclosure designs utilize a separate jet blast deflector ahead of the rear noise attenuating wall to deflect the high velocity engine airflow up and out of the facility. In this design ambient air must mix with the high speed flow off of the discharge of the jet blast deflector surface. These ground run-up enclosure designs place the separate blast deflector well ahead of the tall rear noise attenuating rear wall to allow for a source for the mixing ambient airflow. Using a large open area between the jet blast deflector and the rear noise attenuating wall may create an unstable aerodynamic condition.

SUMMARY

The present invention offers a new and innovative design for either a three sided, four sided, roofed or unroofed ground run-up enclosure that incorporates a vented rear noise attenuating wall and separate jet blast deflector located close to the rear noise attenuating wall. The design provides an adequate and stable mixing air supply to the discharge lip of the separate jet blast deflector so that more engine exhaust momentum is maintained. This improves the front to rear momentum of airflow within the facility improving the engine air inlet conditions. This also reduces recirculation of exhaust flow back to the engine inlet and straightens flow within the facility. At the same time, the design of the ground run-up enclosure of the present invention conserves space. Current designs utilizing a separate jet blast deflector may take up as much as or more than an additional 5-10 meters in length within the facility to allow ample area to provide mixing air behind the jet blast deflector. The vented rear wall of the present invention allows a stable and adequate supply of mixing air to be delivered to the discharge flow of the deflector structure without increasing the length of the facility and without losing the aerodynamic and acoustic advantages of using a separate jet blast deflector. The present invention also provides an acoustically treated duct or channel for the rear noise attenuating rear wall vent that reduces noise levels to the rear of the ground run-up facility. Numerous other advantages and features of the invention will become readily apparent from the detailed description of the preferred manifestation of the invention, from the claims, and from the accompanying drawings.

BRIEF DESCRIPTION OF THE DRAWINGS

For a better understanding of the present invention, and to describe its operation, reference will now be made, by way of example, to the accompanying drawings. The drawings show the different components of the present invention in which:

FIG. 5 is a rear view of a ground run up enclosure with a separate jet blast defector and a vented rear noise attenuating wall.

DETAILED DESCRIPTION OF THE INVENTION

Figure 1:
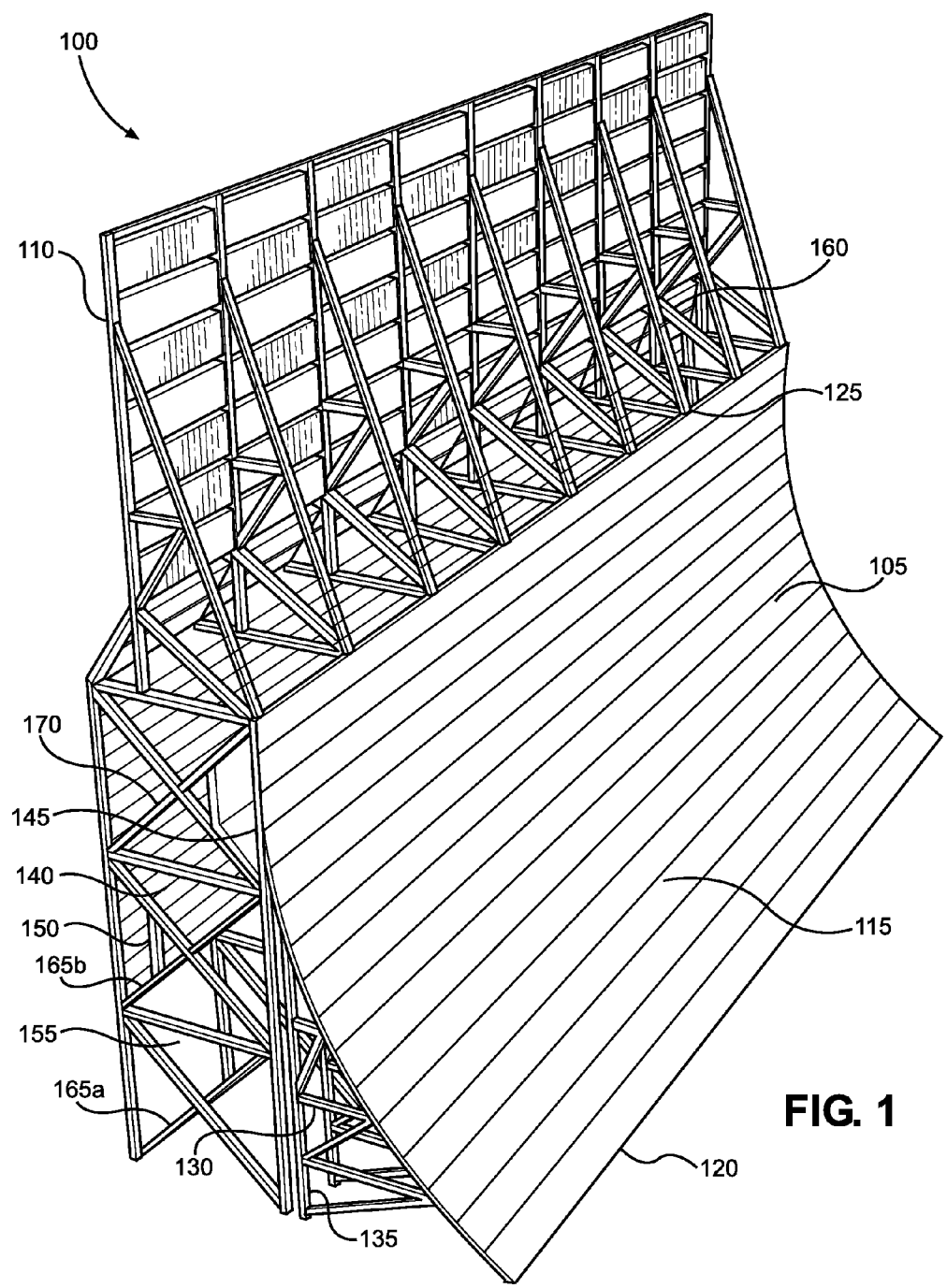
FIG. 1 is a front angle perspective view of a ground run up enclosure with a separate jet blast defector and a vented rear noise attenuating wall.

The present invention will now be described more fully with reference to the accompanying drawings. It should be understood that the invention may be embodied in many different forms and should not be construed as limited to the embodiments set forth herein. Throughout the FIGS. 1-6, like elements of the invention are referred to by the same reference numerals for consistency purposes.

FIG. 1 is a front angle perspective view of ground run up enclosure 100 with a separate jet blast deflector 105 and a vented rear noise attenuating wall 110. Jet blast deflector 105 has a curved or straight front deflecting surface 115 extending from the ground at leading front edge 120 to the top of deflecting surface 115 at discharge edge or lip 125. A jet blast deflector frame 130 supports front deflecting surface 115 from behind. Jet blast deflector frame 130 is typically configured using various horizontal, vertical and angled support members behind deflecting surface 115. Jet blast deflector frame configurations may be found in U.S. Pat. Nos. 5,127,609, 5,429,324, and 5,865,640, each of which is referenced above, as well as U.S. Pat. No. 3,797,787, all of which are incorporated by reference herein in their entirety. The support members making up jet blast deflector frame 130 may be constructed of metal such as steel or aluminum, durable plastic, or a reinforced composite material such as fiberglass, carbon-fiber or Kevlar and may be arranged in any number of different configurations.

Vented rear noise attenuating wall 110 is positioned directly behind separate jet blast deflector 105. Jet blast deflector 105 may or may not be attached to rear noise attenuating wall 110 at any of a number of points including but not limited to frame elements of rear wall 110 that are aligned with and positioned along discharge lip 125 at the top of deflecting surface 115, a rear base of jet blast deflector frame 130 at mounting point 135 and/or any other points on frame 130 either directly or using one or more supporting members.

Figure 2:
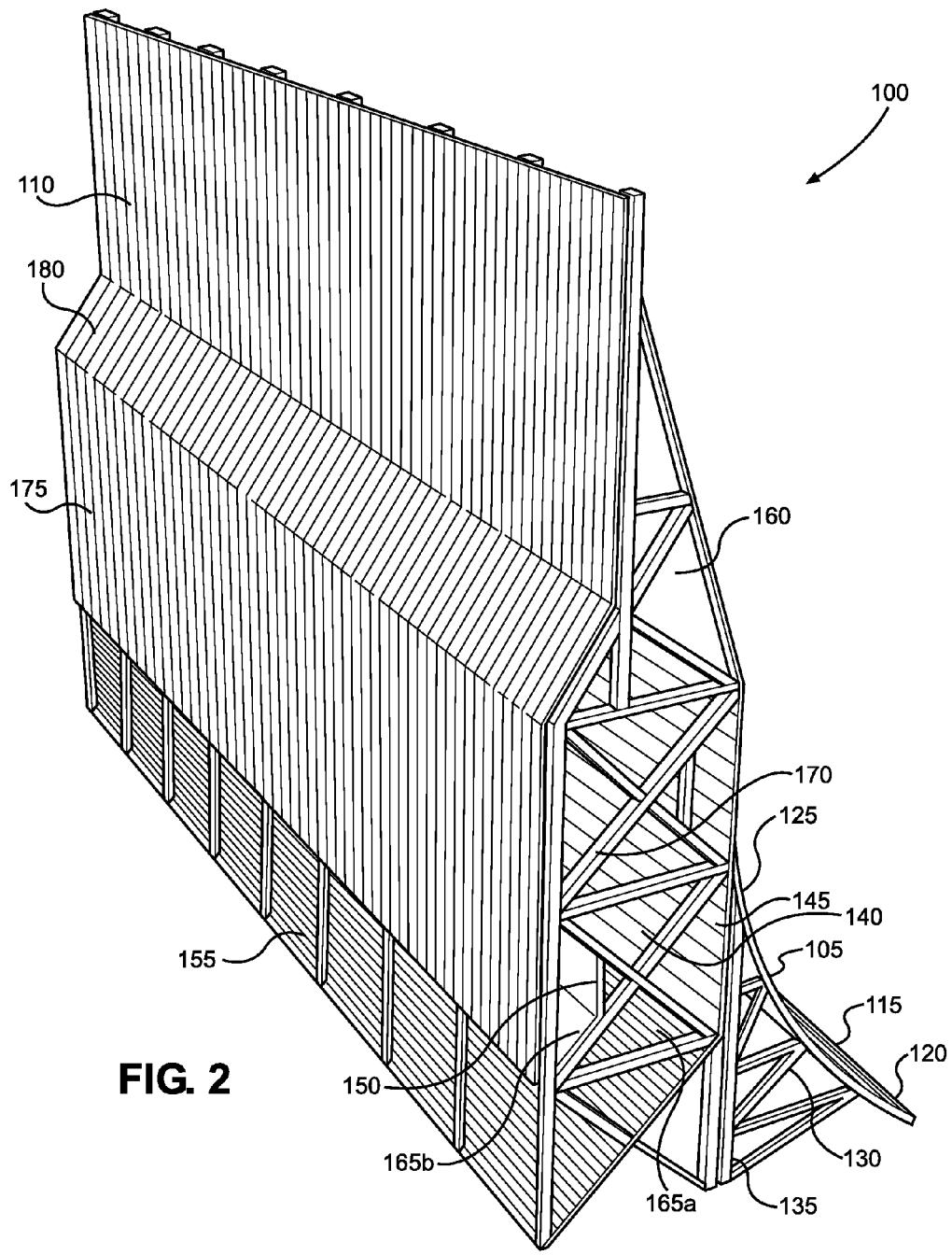
FIG. 2 shows a rear angle perspective view of a ground run up enclosure with a separate jet blast defector and a vented rear noise attenuating wall.

FIG. 2 is a rear angle perspective view of ground run-up enclosure 100 in which vented rear noise attenuating wall 110 is a vertical structure with a vent that is also referred to as a duct or channel 140 situated between a front side 145 and a back side 150 inside rear wall 110. A lower vent opening or air entry port 155 along all or part of the entire length of rear wall 110 is located at the base of back side 150 and provides an entry point for air to enter and flow up through channel 140 before exiting at upper vent opening or air exit port 160 in an area above discharge lip 125 at the top of deflecting surface 115. Channel 140 is configured with internal side panels 165a, 165b lining the front side and back side of channel 140 respectively. Internal side panels 165a-b may be made of sound absorbing material to reduce noise produced by the exhaust flow of an aircraft engine or other noise source within the facility.

Vented rear noise attenuating wall 110 is supported by a rear noise attenuating wall frame 170 that is similar in composition to jet blast deflector frame 130. It is assembled using horizontal, vertical and angled support members that may be formed of any number of different materials including metal, durable plastic or composite members. An exterior rear wall surface 175 of vented rear noise attenuating wall 110 is covered with solid panels to provide a solid noise barrier and to provide rigidity and support to rear wall 110 and may also be used for aesthetic purposes. An angled section 180 of rear wall 110 may or may not be provided along the surface of rear noise attenuating wall 110 for a number of reasons including but not limited to: (a) adding rigidity to the structure of rear wall 110; (b) improving the attenuation of the sound entering channel 140; and (c) improving airflow through channel 140 and out through air exit port 160.

Figure 3:
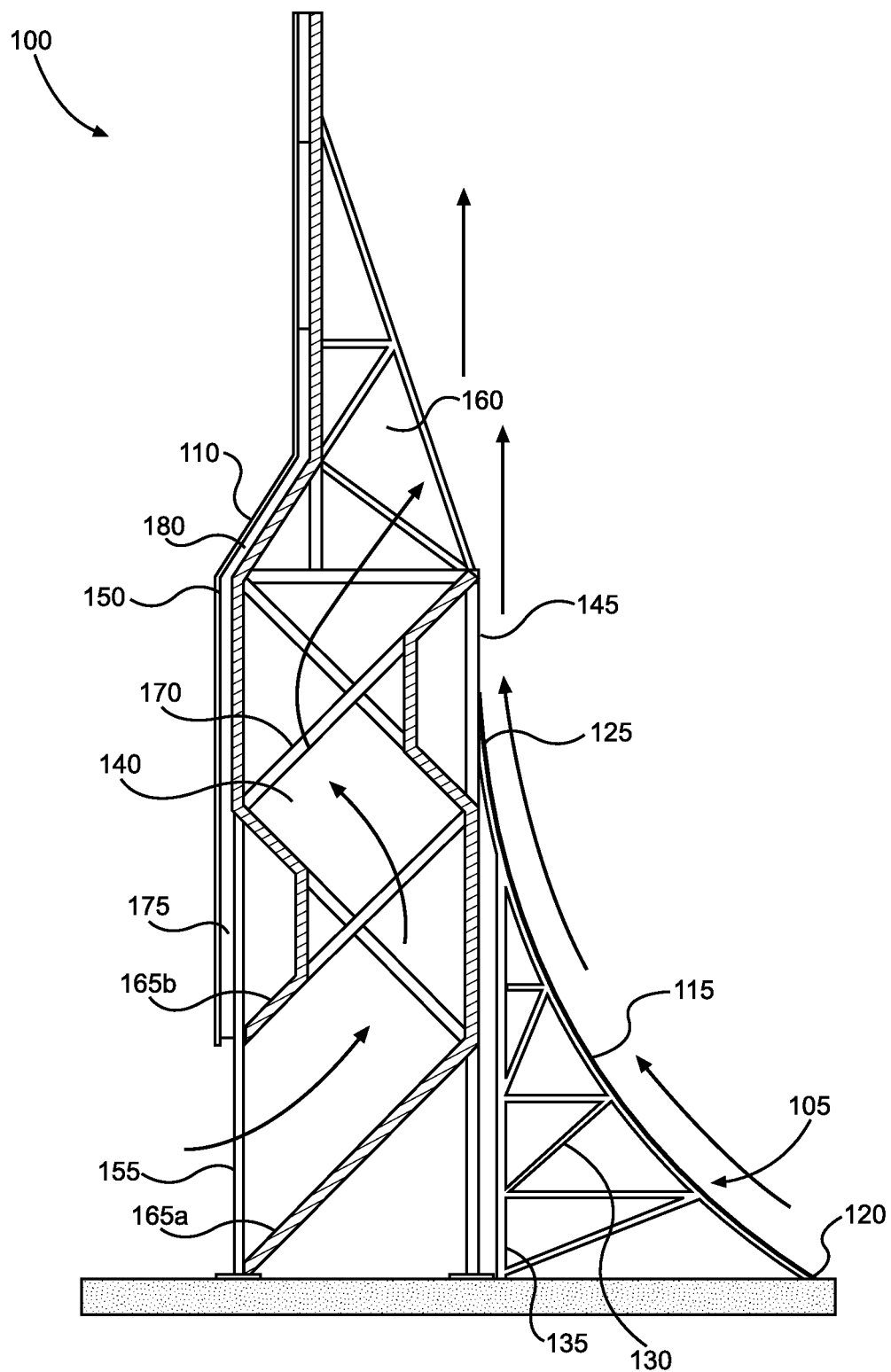
FIG. 3 is a side view of a ground run up enclosure with a separate jet blast defector and a vented rear noise attenuating wall.

FIG. 3 is a side view of ground run-up enclosure 100 with vented rear noise attenuating rear wall 110. In this view, channel 140 with representative airflow arrows can be seen configured in a generally vertical orientation within rear noise attenuating wall 110. While channel 140 may be configured with straight interior walls, there are advantages to a configuration in which the channel walls are alternately angled. One benefit of this design is that sound entering channel 140 at air exit port 160 must bounce angularly multiple times off of internal surfaces of panels 165a, 165b that may be formed of sound absorbing material. With each angled bounce, the sound level is reduced to minimize the level of the sound entering channel 140 at vent opening 155 and exiting at exit port 160.

The airflow that is moving upwards in a generally vertical direction through channel 140 is entrained with the high velocity airflow from an airplane engine (or another source) that hits deflecting surface 115 of jet blast deflector 105. Deflecting surface 115 intercepts jet blast airflow at different heights and it directions it upwards along deflecting surface 115 to discharge lip 125. When the jet blast airflow reaches discharge lip 125 of deflecting surface 115, it induces airflow through channel 140 mixing with the high velocity air from jet blast deflector 105 at exit port 160.

Figure 4:
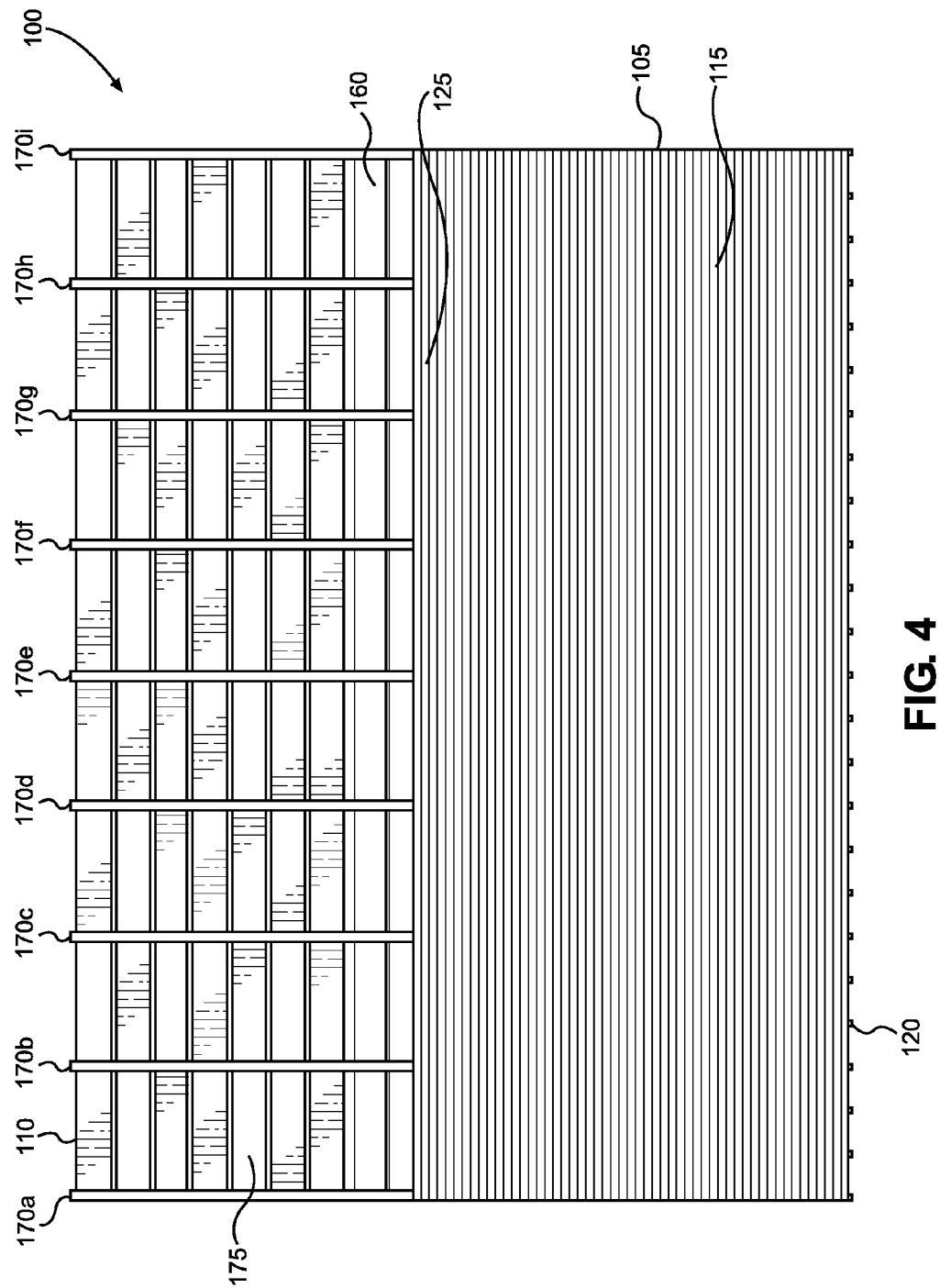
FIG. 4 is a front view of a ground run up enclosure with a separate jet blast defector and a vented rear noise attenuating wall.

FIG. 4 is a front view of ground run-up enclosure 100 with vented rear noise attenuating wall 110. In this view, deflecting surface 115 is visible extending from the ground at leading edge 120 to the top at discharge lip 125. Deflecting surface 115 may be curved, inclined, or straight. Airflow exit port 160 of channel 140 can be seen between top edge 125 and the top of rear noise attenuating wall 110 where the two airflows meet and mix together. In addition, vertically oriented elements of frame 170a-i can be seen extending across blast deflector structure 100. Frame elements 170a-i support exterior rear wall surface 175.

FIG. 5 is a rear view of ground run-up enclosure 100 with vented rear sound attenuating wall 110. Elements of rear wall frame 170a-i are visible at the base of rear wall 110 as is vent opening 155 in the exterior rear wall surface 175 of rear noise attenuating wall 110. An angled portion 180 of rear wall 110, which is optional, helps to improves rigidity of rear wall structure 110, improve airflow in channel 140 and attenuation of sound in channel 140. At the base of rear noise attenuating wall 110, and between rear wall frame elements 170a-i, internal side panel 165a is visible and affixed to rear noise attenuating wall frame 170.

Figure 6B:
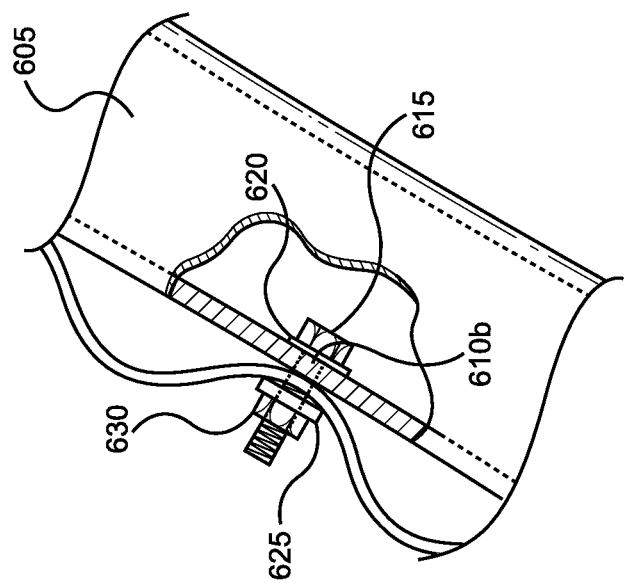
FIG. 6A-B are detailed views of the blast deflector structure showing mounting points for attaching the front deflecting surface to the blast deflector frame.
Figure 6A:
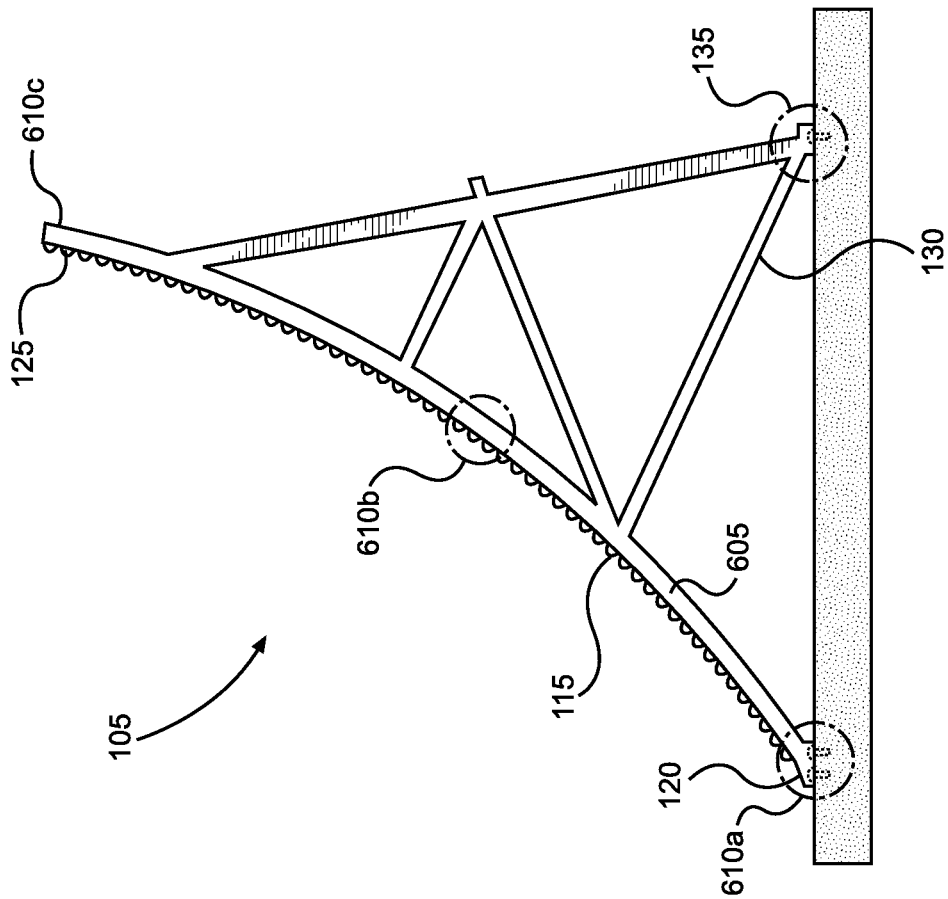

FIGS. 6A-B are detailed views of the front deflecting surface of the jet blast deflector showing mounting points for attaching deflecting surface 115 to jet blast deflector frame 130. FIG. 6A is a side view of a sample deflecting surface 115 mounted or affixed to jet blast deflector frame 130. Deflecting surface 115 may be made of metal such as steel or aluminum, fiberglass, or a reinforced composite material such as carbon-fiber or Kevlar. In the embodiment shown, the material used for front wall surface 115 should be thin enough or corrugated so that it is flexible in the horizontal direction to fit vertically to the shape of a front frame element 605 that is a curved rib. There may be several attachment points along each curved rib 605 such as, for example, at attachment point 610a, 610b and 610c.

FIG. 6B is a detailed view of attachment point 610b where deflecting surface 115 is attached to front frame element 605 that is a curved or straight rib. Front wall surface 115 as shown, for example. A bolt 615 is passed through a first washer 620 on the back side of frame element 605 then deflecting surface 115 before being secured in place by a second washer 625 and a lock nut 630.

Some prior art ground run-up enclosures use a sloped noise attenuating rear wall to deflect the high velocity jet blast. That geometry directs the engine airflow in an upward direction that is not aerodynamically efficient causing a loss of momentum. This results in a buildup of pressure at the rear wall leading to recirculation of flow within the facility. Rearward momentum in the facility is decreased reducing the discharge velocity and angle. This design also places the mixing region above the acoustically treated wall and noise created in this mixing region is not contained by the rear noise attenuating wall.

If a separate jet blast deflector is used to deflect the engine flow airflow ambient air that must mix with the high speed flow off of the discharge of the jet blast deflector must come from the inside of the facility. This creates an unstable condition and requires the deflecting surface to be located well ahead of the rear wall.

In operation and as shown in FIG. 3, ground run-up enclosure 100 effectively deflects high velocity engine exhaust flow up and out of a facility while maintaining engine exhaust momentum. A facility's length may be reduced by at least 5-10 meters because ground run-up enclosure 100 provides a source of mixing airflow and more efficient and stable airflow within the facility. In particular, mixing air is drawn from an area behind ground run-up enclosure 100. This air supply is both stable and plentiful. The stable air is drawn into channel 140 within rear noise attenuating wall 110 through vent opening 155 at the base of rear noise attenuating wall 110 and is drawn up and through channel 140 before mixing with the airflow of high speed engine exhaust where the two airflows meet at exit port 160 and discharge lip 125 at the top of deflecting surface 115. In this configuration, the front to rear momentum of flow within the facility improves engine air inlet conditions by straightening flow within the facility and also reduces the recirculation of exhaust flow back to the engine inlet.

The design of ground run-up enclosure 100 and the airflow through channel 140 can be either passive as is generally the case, or active. In the case of passive airflow, the motive force to move the air through channel 140 is the momentum of jet blast from an aircraft engine or another blast source. Since air is inherently "sticky" (i.e., has viscosity), as such, a jet of high velocity air will induce the air around the high velocity airflow to move. This process is referred to as entrainment. The air moving through the channel 140 is drawn by the movement of the air at discharge lip 125 of deflecting surface 115. Using the aircraft engine as a fan for motivating airflow means, in essence, that a very large fan is producing the energy to produce airflow movement in channel 140. The volume and velocity of airflow created by a large aircraft engine has sufficient energy to draw large amounts of air through channel 140

An important design feature of ground run-up enclosure 100 is the area where the jet blast on deflecting surface 115 at discharge lip 125 mixes with the entrained air exiting channel 140 through exit port 160. The airflow of the jet blast at discharge lip 125 of deflecting surface 115 produces a shear layer, or layers of moving air at different velocities. A shear layer at discharge lip 125 in a structure without a directed channel airflow stream results in flow separation, vortex shedding, and increased turbulence. In contrast, the airflow through channel 140 introduces a directed stream of moving air at exit port 160 where it meets and combines with the jet blast at discharge lip 125 reducing the shear layer effects, including but not limited to separation and vortex shedding that increase turbulence. Channel 140 operates in a manner analogous to an aircraft wing's trailing edge which is aerodynamic and produces a smooth airflow. This is in contrast to a body with a blunt trailing edge, like a semi trailer, in which the high speed air flowing along the top and sides reach the rear of the trailer and have nothing to follow. The stream separates and becomes a turbulent and unstable flow. Ground run-up enclosure 100 with a rear vent or channel 140 acts like a wing with a trailing edge. The jet blast air flow moving smoothly across deflecting surface 115 and the airflow moving smoothly through channel 140 combine together in a smooth, non-turbulent manner in much the same way that airflows over the top and the bottom of an aircraft wing combine at the trailing edge of the wing. In both cases, the low angle of combination results in a smooth, less-turbulent airflow.

Channel 140 is configured to move a stream of air from the rear of ground run-up enclosure 100 to discharge lip 125, which in turn helps the jet blast maintain its momentum. The resulting combined airflow stream above discharge lip 125 continues to flow at high velocity and at an angle that allows for a smooth mixing with the airflow leaving channel 140 at exit port 160. The resulting airflow of the combined streams has low turbulence levels, and discharges at higher velocities and at a high discharge angle. Using the entrained air in a control device, in this case channel 140, translates to direct incoming entrained air minimizing the adverse effects of the shear layer generated by the jet blast.

While the invention has been described with respect to the figures, it will be appreciated that many modifications and changes may be made by those skilled in the art without departing from the spirit of the invention. Any variation and derivation from the above description and drawings are included in the scope of the present invention as defined by the claims.

What is claimed is:

1. An apparatus for providing airflow to the discharge of a blast deflector, comprising:
   a blast deflector, comprising:
      an air deflecting surface, comprising:
      a leading edge proximate to a ground surface,
      a discharge lip above and generally parallel to the leading edge; and
      a surface area between the leading edge and the discharge lip; and
   a rear wall positioned behind the jet blast deflector, comprising:
      a rear wall frame;
      a front wall surface affixed to a front side of the rear wall frame having an upper edge that is proximate the discharge lip; and
      a rear wall surface affixed to a rear side of the rear wall frame;
   a channel with sides formed between the front wall surface and the rear wall surface;
   an airflow entry port at a first end of the channel in the rear wall surface; and
   an airflow discharge port at a second end of the channel proximate the discharge lip of the blast deflector that is above the height of the entry port and on the front side of the rear wall frame.

2. The apparatus of claim 1 further comprising at least one panel affixed to a surface inside the channel.

3. The apparatus of claim 2 wherein the at least one panel is affixed to the rear wall frame at an angle between the first wall and the second wall that is not parallel to the first wall and the second wall.

4. The apparatus of claim 1 wherein the air deflecting surface is curved between the leading edge and the discharge lip.

5. The apparatus of claim 1 wherein at least a portion of a side of the channel is angled reducing pressure loss of air flowing in the channel.

6. The apparatus of claim 2 wherein the at least one panel is covered in acoustically absorbent material.

7. The apparatus of claim 1 where the frame of the rear wall supports the blast deflector.

8. The apparatus of claim 1 further comprising a blast deflector frame supporting the blast deflector wherein the blast deflector frame is combined with the frame of the rear wall.

9. The apparatus of claim 1 further comprising additional surfaces within the channel affixed to the rear wall frame that straighten and direct the airflow within the channel.

10. The apparatus of claim 1 wherein at least one of the front wall surface and the rear wall surface are comprised of noise attenuating material.

11. A method of deflecting airflow, comprising:
   providing a blast deflector frame;
   affixing an air deflecting surface to the blast deflector frame wherein the air deflecting surface comprises:
      a leading edge proximate to a ground surface,
      a discharge lip above and generally parallel to the leading edge; and
      a surface area between the leading edge and the discharge lip;
   providing a rear wall having a rear wall frame positioned behind the blast deflector;
   affixing a front wall surface to a front side of the rear wall frame and behind the blast deflector, wherein the front wall surface has an upper edge that is proximate the discharge lip of the deflecting surface;
   affixing a rear wall surface to a rear side of the rear frame;
   forming a channel between the front wall surface and the rear wall surface having an airflow entry port at a first end of the channel in the rear wall surface and an airflow discharge port at a second end of the channel proximate the discharge lip of the blast deflector wherein the discharge port is at a height above the entry port and on the front side of the rear wall frame; and
   wherein, in response to jet blast air moving along the surface area between the leading edge and the discharge lip, entrained air flows into the channel through the entry port and mixes with the jet blast air as the entrained air exits the discharge port.

12. The method of claim 11 further comprising affixing at least one panel to a surface inside the channel.

13. The method of claim 12 wherein the at least one panel is affixed to the rear wall frame at an angle between the front wall surface and the rear wall surface that is not parallel to the front wall surface and the rear wall surface.

14. The method of claim 11 wherein the deflecting surface is curved between the leading edge and the discharge lip.

15. The method of claim 11 wherein a wall surface at the bottom of the channel is angled reducing pressure loss of the air flowing in the channel.

16. The method of claim 12 wherein the at least one panel is covered in acoustically absorbent material.

17. The method of claim 11 wherein the rear wall frame supports the blast deflector.

18. The method of claim 11 wherein a blast deflector frame supports the blast deflector and further wherein the blast deflector frame is integrated with the rear wall frame.

19. The method of claim 11 wherein the rear wall comprises additional surfaces affixed to the rear wall frame within the channel that straighten and direct the airflow within the channel.

20. The method of claim 11 wherein at least one of the front wall surface and the rear wall surface are comprised of noise attenuating material.

* * * * *